(12) United States Patent
Grytå

(10) Patent No.: US 8,967,220 B2
(45) Date of Patent: Mar. 3, 2015

(54) METHOD AND ASSEMBLY FOR THE PRODUCTION OF A HOMOGENOUS COMPOSITE PIPE OF UNSPECIFIED LENGTH

(71) Applicant: Wellstream International Limited, Newcastle-upon-Tyne (GB)

(72) Inventor: Ole A. Grytå, Asker (NO)

(73) Assignee: GE Oil & Gas UK Limited, Nailsea, Bristol (GB)

( * ) Notice: Subject to any disclaimer, the term of this patent is extended or adjusted under 35 U.S.C. 154(b) by 0 days.

(21) Appl. No.: 14/063,382

(22) Filed: Oct. 25, 2013

(65) Prior Publication Data

US 2014/0060744 A1  Mar. 6, 2014

Related U.S. Application Data

(62) Division of application No. 12/439,853, filed as application No. PCT/IB2007/002550 on Sep. 4, 2007, now Pat. No. 8,597,451.

(30) Foreign Application Priority Data

Sep. 5, 2006  (NO) .................................... 20063949

(51) Int. Cl.
*B29D 23/00* (2006.01)
*B29C 53/60* (2006.01)
(Continued)

(52) U.S. Cl.
CPC ............ *B29D 23/001* (2013.01); *B29C 53/607* (2013.01); *B29C 53/62* (2013.01); *B29C 53/68* (2013.01)
USPC ............................ 156/459; 156/549; 156/173

(58) Field of Classification Search
CPC ...... B29C 53/607; B29C 53/62; B29C 53/68; B29D 23/001

USPC ......... 156/428, 430, 191, 173, 187, 425, 431, 156/433, 549, 556
See application file for complete search history.

(56) References Cited

U.S. PATENT DOCUMENTS 3,202,560 A    8/1965  Michael
3,874,970 A *  4/1975  Dunn ............................ 156/169
(Continued)

FOREIGN PATENT DOCUMENTS

BE    772303    1/1972
EP    475412    3/1992
(Continued)

OTHER PUBLICATIONS

Search Report from the Norwegian Industrial Property Office for corresponding Norwegian Application No. 20063949, Mar. 30, 2007.
(Continued)

*Primary Examiner* — Jacob T Minskey
*Assistant Examiner* — Vishal I Patel
(74) *Attorney, Agent, or Firm* — Klarquist Sparkman, LLP

(57) ABSTRACT

A method of forming a homogenous composite pipe of unspecified length from strips of fiber reinforced thermoplastic material is disclosed. A mandrel is arranged stationary in a process direction to extend freely from a first supported end to a second end. A slip-sheath is applied about the mandrel. The thermoplastic material strips are wound about the slip-sheath. A section of the thermoplastic material strip winding is consolidated. The slip-sheath is formed from tape material which is applied longitudinally onto the mandrel surface. The slip-sheath is connected to a puller arranged downstream of the mandrel in the process direction. Consolidated pipe sections are pulled off from the second end of the mandrel in synchronization with the winding and consolidation. An assembly for carrying out the method.

11 Claims, 1 Drawing Sheet

(51) Int. Cl.
*B29C 53/62* (2006.01)
*B29C 53/68* (2006.01)

(56) References Cited

U.S. PATENT DOCUMENTS

| | | | |
|---|---|---|---|
| 4,010,054 | A | 3/1977 | Bradt |
| 4,689,003 | A | 8/1987 | Schreiner et al. |
| 6,889,716 | B2 | 5/2005 | Lundberg et al. |
| 2002/0112810 | A1* | 8/2002 | Polzin et al. ............ 156/188 |

FOREIGN PATENT DOCUMENTS

| | | |
|---|---|---|
| JP | 54-111583 | 8/1979 |
| JP | 1-198343 | 8/1989 |
| JP | 7-31336 | 2/1995 |
| WO | WO03/037770 A1 | 5/2003 |
| WO | WO2005/108046 A1 | 11/2005 |

OTHER PUBLICATIONS

International Search Report of the International Searching Authority, mailed Jan. 31, 2008, for corresponding International Application No. PCT/IB2007/002550, 4 pages.
Written Opinion of the International Searching Authority, mailed Jan. 31, 2008, for corresponding International Application No. PCT/IB2007/002550, 4 pages.
Office Action from the United States Patent & Trademark Office in co-pending U.S. Appl. No. 12/439,853, dated Aug. 30, 2011.
Office Action from the United States Patent & Trademark Office in co-pending U.S. Appl. No. 12/439,853, dated Nov. 14, 2011.
Office Action from the United States Patent & Trademark Office in co-pending U.S. Appl. No. 12/439,853, dated Jul. 18, 2012.
Office Action from the United States Patent & Trademark Office in co-pending U.S. Appl. No. 12/439,853, dated Mar. 1, 2013.
Notice of Allowance from the United States Patent & Trademark Office in co-pending U.S. Appl. No. 12/439,853, dated Sep. 25, 2013.

* cited by examiner

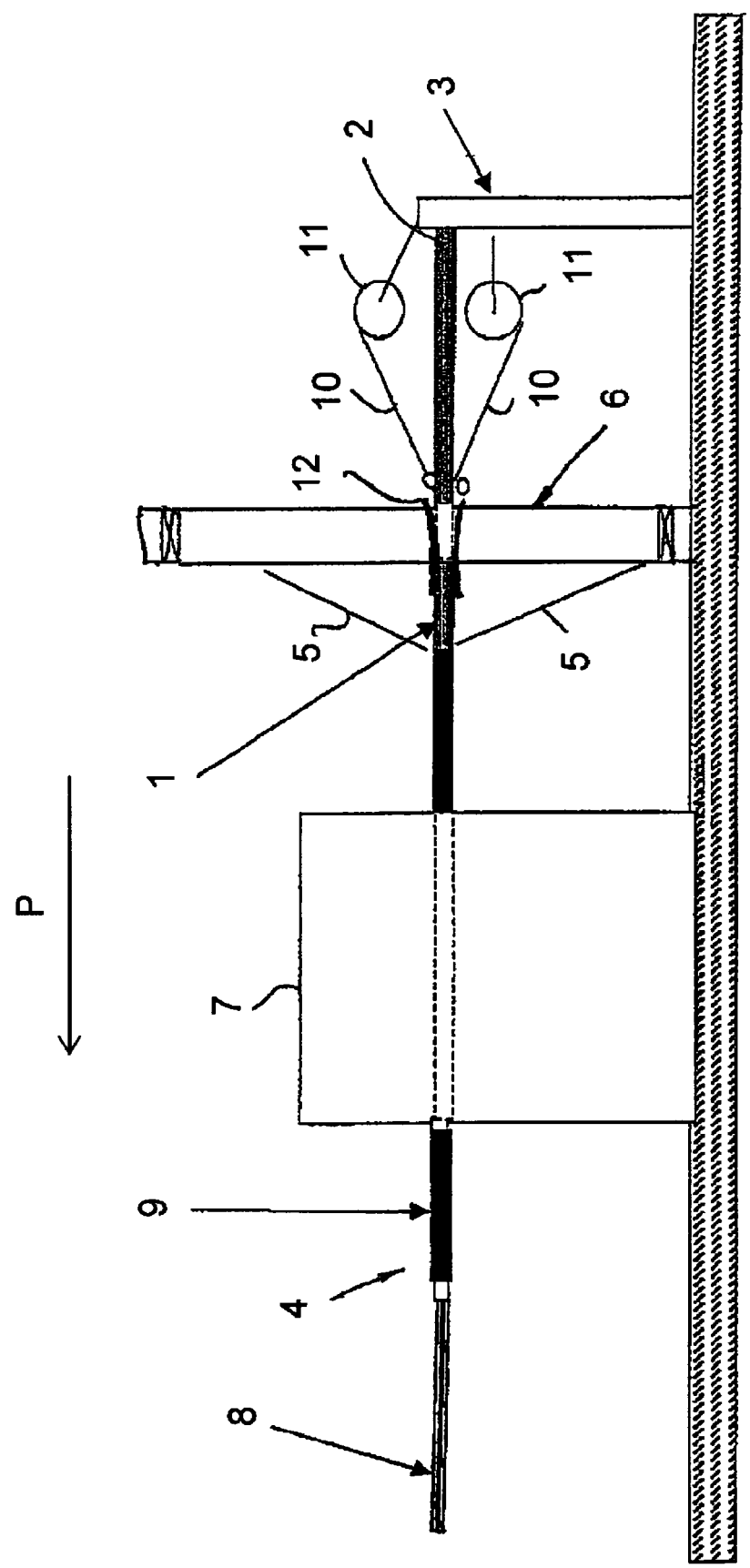

METHOD AND ASSEMBLY FOR THE PRODUCTION OF A HOMOGENOUS COMPOSITE PIPE OF UNSPECIFIED LENGTH

CROSS REFERENCE TO RELATED APPLICATIONS

This application is a divisional of U.S. patent application Ser. No. 12/439,853, filed Mar. 4, 2009, which is the U.S. National Stage of International Application No. PCT/IB2007/002550, filed Sep. 4, 2007, which in turn claims the benefit of and priority to Norwegian Patent Application No. 20063949, filed Sep. 5, 2006.

FIELD

The present invention relates to a method for producing a pipe composed of strips of fibre reinforced thermoplastic that are wrapped about a mandrel, whereupon heat is supplied for consolidation of the fibre reinforced thermoplastic to produce a composite pipe of unspecified length. The present invention also relates to an assembly for producing such composite pipe of unspecified length.

BACKGROUND & SUMMARY

The composite pipe in question finds use within different fields of industry where fluids need transporting, and is characterized through low weight, high strength and high chemical resistance. Advantageously, though not exclusively, the composite pipes may be employed as flexible risers, flowlines, pipe-lines, umbilical pipes, pressure casings for process equipment, containers and structural members within the oil and gas industry.

Composite pipes of the type referred to are known to be produced by winding and consolidating a strip- or band-shaped, fibre reinforced thermoplastic, known as a prepreg, about a tubular base that conventionally remains inside the consolidated thermoplastic, thus forming an internal liner which is bonded to the external pipe wall made of cured thermoplastic material. The term "prepreg" refers to a mat, fabric, non-woven material or roving pre-impregnated with resin. The fibre reinforced thermoplastic recited above is a polymer composite which is partially cured and ready for moulding, comprising fibres embedded in a matrix of thermoplastic polymer material which solidifies into the shape applied when cooled from a temperature effective for melting of the matrix. The solidifying process is called consolidation. The fibres may extend in essentially the one and same direction in a unidirectional manner.

Among the prior art available, reference can be made to WO2005/108046 A1, as well as WO2003/037770A1, each of which represents the prior art which includes the composites pipes having internal liners.

Likewise, JP-1198343 discloses a method by which a layer of prepreg material is wound onto a base layer comprising a carbon paper which is previously wound about a mandrel. The paper base and prepreg layers are baked together, whereupon the mandrel is pulled out from the resulting baked body. Pipes of specified lengths adapted to the length of the mandrel are produced this way, and released by pulling the mandrel out from the resulting pipe.

Composite pipes having an internal liner bonded to external structural layers made of thermoplastic materials may suffer the occurrence of cracks and separation between the internal liner and the exterior thermoplastic layer. One plausible cause for such separation and cracks formation is the use of different materials having different material properties for structuring the liner and thermoplastic external layer, respectively. The conditions under which the composite pipe operates may contain temperature differentials over the pipe wall in the order of several hundred degrees C., pipes combined in lengths that cover kilometer distances, transversal movements and bending causing contra-directional axial loads on the pipe layers, high pressures prevailing at substantial sea depths, etc.

An object of the present invention is thus to reduce or essentially eliminate the drawbacks related to the pipes structured through the combination of an internal liner which is bonded to an external pipe wall.

Another object is to provide a method and assembly through which homogenous composite pipes of unspecified lengths, or endless pipes, are producible.

These objects are met in a composite pipe as produced through the method.

The objects are likewise met in a composite pipe as produced through the assembly for carrying out the method.

Briefly, in the present invention there is provided a production method and an assembly by which multiple layers of fibre reinforced thermoplastic strips are applied onto a mandrel to fabricate a homogenous composite pipe of unspecified length.

The method of the present invention comprises the steps of: arranging a mandrel stationary in a process direction to extend freely from a first supported end to a second end; applying a slip-sheath about the mandrel; winding the thermoplastic material strips about the slip-sheath; and consolidation of a section of the thermoplastic material strip winding. The method is further characterized through the steps of forming the slip-sheath from tape material which is applied longitudinally onto the mandrel surface; connecting the slip-sheath to a pulling means arranged downstream of the mandrel in the process direction, and pulling consolidated pipe sections off from the second end of the mandrel in synchronization with the steps of winding and consolidation.

The steps of winding and consolidation may be synchronized with an incremental pulling of consolidated sections of composite from the mandrel, or may alternatively be synchronized with a continuous pulling of consolidated sections of composite from the mandrel.

Preferably, the slip-sheath material is a liquid-soluble material tape, and most preferred a cellulose fibre in a matrix of water-based resin formed into a tape, which is applied about the mandrel in advance of the winding of strips of fibre reinforced thermoplastic, as seen in the process direction.

Advantageously, the winding is performed from singular or multiple supplies of fibre reinforced thermoplastic driven through a revolving path about the mandrel.

The revolving supplies of fibre reinforced thermoplastic may be arranged for a reciprocating motion in the process direction, or may alternatively and preferred be stationary arranged, with respect to the process direction.

Consolidation of the fibre reinforced thermoplastic is performed through the supply of heat to the wound strips of fibre reinforced thermoplastic at a location upstream of the second end of the mandrel. A heater with a capacity to apply, circumferentially, a temperature necessary for melting the polymer matrix of the fibre reinforced thermoplastic, may be arranged for reciprocating motion in the process direction, though alternatively and preferred the heater is stationary with respect to the process direction.

Pulling the homogenous composite pipe off from the second end of the mandrel comprises further winding of consolidated pipe sections onto a large diameter spool.

In the method, a finishing step comprises cleaning the pipe interior from residues of slip-sheath material. The cleaning step may involve flooding the pipe interior with water, and/or mechanically removing residues of slip-sheath material from the pipe interior.

An assembly by which a homogenous composite pipe of unspecified length is produced according to the method briefly comprises a mandrel which is stationary supported in a first end to extend freely in a process direction from said first end to a second end; means for forming a slip-sheath about the mandrel; a winder mechanism revolving about the mandrel downstream of said first end carrying at least one supply of thermoplastic material strips; and a heater surrounding the mandrel upstream of said second end. The assembly is further characterized in that said means for forming the slip-sheath about the mandrel is arranged to apply a tape material longitudinally onto the mandrel surface, and in that a pulling means is arranged downstream of the mandrel to be connectable to the slip-sheath.

The operations of the winder mechanism and heater are synchronized with an incremental operation of the pulling means. Alternatively and preferred, the operations of the winder mechanism and heater are synchronized with a continuous operation of the pulling means.

In a preferred embodiment, the slip-sheath applying means comprises at least one rotary supply of tape-shaped slip-sheath material arranged upstream of the winding mechanism for feeding the tape longitudinally along the mandrel. The slip-sheath applying means advantageously comprises a tape guide funnel arranged for forming the tape circumferentially about the mandrel.

Advantageously, the pulling means comprises a large diameter spool driven for rotation, onto which the composite pipe sections is wound from the mandrel.

Advantageously, the method and assembly of the present invention are implemented in the production of a homogenous composite pipe suitable as a flow-line for transportation of fluids, such as oil and/or gas.

The method and assembly of the present invention are likewise advantageously implemented in the production of a homogenous composite pipe suitable as a sub-sea structure for the off-shore industry.

The method and assembly of the present invention are also advantageously implemented in the production of a homogenous composite pipe suitable as a production or injection riser for oil and/or gas and/or water.

The method and assembly of the present invention are likewise advantageously implemented in the production of a homogenous composite pipe suitable as an umbilical pipe.

The invention thus makes fabrication of unspecified or continuous lengths of homogenous composite pipes possible, without relying on a tubular member remaining inside the finished pipe as an internal liner.

The present invention provides an advantage above the prior art in that homogenous pipe sections of unspecified length are producible in a continuous manner, in other words endless pipes may be produced. In contrast to a helically applied base layer, such as the one disclosed in JP-1198343, a slip-sheath applied in longitudinal direction onto the mandrel surface as disclosed in the present invention provides reduced frictional resistance as consolidated pipe sections are successively pulled off from the stationary mandrel. By building the slip-sheath from tapes extending in longitudinal direction, and connecting a pulling means to the slip-sheath, the pulling force applied is fully absorbed by the slip-sheath and the helical windings of thermoplastic strips remain unaffected from any tensile stresses that would otherwise be applied from the pulling means. This aspect is considered to be of importance in the continuous production of pipes of unspecified lengths, wherein unconsolidated sections of helically wound thermoplastic strips are moving along the mandrel as consolidated sections of the pipe are pulled off from the mandrel.

The present invention is more closely explained below, with reference made to the accompanying drawing.

BRIEF DESCRIPTION OF THE DRAWING

The drawing is a side elevation view of an assembly for producing a composite pipe.

DETAILED DESCRIPTION

In the following, the expression "fibre reinforced thermoplastic" refers to a fibre reinforced polymer matrix, which cures into a solid state through a consolidation process where heat is applied to raise the temperature of the polymer matrix above its melting point, followed by cooling. The expression "strips" shall be understood to comprise fibre reinforced thermoplastic shaped into bands or strings of suitable width and thickness. The fibre may be a carbon fibre, Kevlar fibre, aramid fibre or glass fibre, or any suitable type of fibre. The fibres are embedded in a polymer matrix, such as high density polyethylene, cross-linked polyethylene, polyamide polyvinylidene fluoride, e.g., or any other polymer suitable for thermoforming. The fibres may be embedded in the polymer matrix in the form of woven fabrics, roving, tows, or yarns, e.g. The strips of fibre reinforced thermoplastic preferably contain fibres that are uni-directionally embedded in the polymer matrix. The fibre reinforced thermoplastic may have a fibre content of 30-80% fibres per volume, and a strip thickness of typically about 0.1-0.5 mm. The width transverse to the longitudinal direction of the strips of fibre reinforced thermoplastic is typically about 1-25 mm. However, other widths, thicknesses, fibre contents, fibre and polymer materials not mentioned may be applied in a fibre reinforced thermoplastic which operates with the method and assembly of the present invention.

A "mandrel" as this term is used herein refers to a core utilized in a thermoforming process as an element onto which a thermoplastic material is shaped through the application of heat, and which is successively released from the produced composite pipe as the thermoplastic material is solidified into the applied shape. A "liner" is a tubular element onto which the thermoplastic material is shaped through the application of heat, and which remains included in the resulting composite pipe wall as the thermoplastic material consolidates onto the surface of the liner.

"Unspecified length" as used herein reflects the production of continuous or endless pipe lengths, in contrast to pipe lengths adapted to the length of a mandrel on which the pipes are formed.

The scope of invention also includes the application of fibre reinforced thermosetting matrices in the composite wall structure, if appropriate.

An assembly for carrying out the method is diagrammatically illustrated in the drawing. With reference to the drawing, a mandrel 1 is stationary supported in a first end 2 to extend freely in a process direction P from a mandrel support 3, resting on a production plant floor, to a second end 4. The second end 4 preferably is non-supported, however a roller support or similar (not illustrated) may be arranged below the mandrel and the produced composite pipe in the region of the second end, if appropriate. The mandrel 1 provides the core in the process of thermoforming a homogenous composite pipe having no internal liner. The mandrel 1, the diameter and cross-sectional shape of which determines the size and shape of the pipe, has a smooth outer surface and may be produced of metal, preferably of steel, or any suitable synthetics material. The mandrel 1 may alternatively be produced from synthetics material and metal in combination, having for example an upstream portion made of low friction synthetics material, and a downstream portion with excellent stability against heat expansion in the consolidation area, made of steel, e.g. The mandrel 1 typically has a circular section, and may be hollow.

At least one supply of thermoplastic strips 5 is carried in a winding mechanism 6 arranged and driven for revolving motion about the mandrel 1, downstream of the mandrel support 3 as viewed in the process direction P. The structure of a winding mechanism 6 typically comprises a ring member rotationally journalled in a base member, as well as a drive means for revolving the ring onto which one or several supplies of fibre reinforced thermoplastic strips are carried on rotary spools. Preferably, at least two supplies of fibre reinforced thermoplastic strips are carried by the winding mechanism, which may be operated for winding the strips 5 in helical paths about the mandrel 1, and with a back-tension that tightens the windings about the mandrel. Naturally, two or more winding mechanisms 6 may be arranged in succession along the process path.

Downstream of the winding mechanism 6, a heater 7 is arranged to supply heat circumferentially about the wound strips of fibre reinforced thermoplastic. The heater 7 is effective for raising the temperature in the wound strips 5 sufficiently to reach the melt point temperature of the polymer matrix. Any suitable heating source known in the art is available for a heater 7, such as electromagnetic radiation, infrared radiation, laser radiation, microwave radiation, or hot gases, open flames, contact heat or vibration, e.g. by means of ultra sound, or electrical resistance, or through any suitable combination thereof.

The heater 7 is positioned upstream of the second end 4 of the mandrel at a distance therefrom sufficient to ensure sufficient cooling and consolidation of the composite pipe downstream of the heater, before releasing from the mandrel as will be explained below. If appropriate, a cooler (not illustrated) may be arranged downstream of the heater 7.

In the heater, sufficient consolidation pressure is provided through a back-tension applied upon winding and maintained in the strips wound about the mandrel, assisted from an anisotropic thermal expansion of the fibre reinforced thermoplastic strips typically having a thermal expansion coefficient in the thickness direction which is considerably larger than the same in a longitudinal direction of the strips.

A pulling means, in the drawing represented by a pulling line 8, is successively arranged in the process direction P and effective for pulling consolidated sections 9 of the resulting pipe off from the second end 4 of the mandrel. The pulling means may be realized as a large diameter spool or carousel which is driven for rotation, known per se by the skilled person, and onto which the consolidated pipe is successively pulled off from the mandrel. Other suitable arrangements for the transport of a continuous pipe may be used as alternative to the mentioned spool or carousel, as long as measures are provided for connecting the pulling means to a longitudinally applied slip-sheath as explained hereinafter.

According to the invention, the strips of fibre reinforced thermoplastic are wound onto a slip-sheath applied about the mandrel 1, under the wound layer/layers of fibre reinforced thermoplastic strips 5. The slip-sheath is preferably made of a liquid-soluble material, which is formed into the shape of a band or tape. The slip-sheath material is chosen to withstand the melting temperature of the polymer matrix, reaching temperatures of about 300 degrees C., e.g., or more. The slip-sheath may be a tape 10 containing organic fibres in a water-based matrix, such as a paper tape containing cellulose fibres, which is effective for preventing the consolidated composite pipe from bonding onto the mandrel 1.

The tape 10 which is used for forming the slip-sheath is applied longitudinally to the mandrel surface. A supply 11 of tape 10 is arranged in the process direction upstream of the winding mechanism 6. As illustrated, two continuous lengths of tape 10 may be applied onto the mandrel surface from diametrically opposite sides of the mandrel. The tapes 10 have a width sufficient to enclose the mandrel circumferentially when applied in combination, and curved over the mandrel surface. On application, the tapes 10 are introduced into a tape guide funnel 12 arranged about the mandrel downstream of the tape supply 11. The tape guide funnel 12 thus controls the tapes to conform to the shape of the mandrel, tightly following the typically circular surface of the mandrel.

Operation of the assembly is initiated through the application of the slip-sheath in longitudinal strips about the mandrel. Typically, two strips of slip-sheath forming tapes 10 are fed from supplies 11 through the tape guide funnel 12 and past the fibre reinforced thermoplastic strip winding mechanism 6. The ends of the tapes are then connected to the pulling means, such as to the end of pulling line 8.

Connecting to the pulling line may be achieved in any suitable manner, such as through a connecting plug in the end of the pulling line onto which the tape ends of the slip-sheath are mechanically connected or bonded by means of an adhesive, e.g. Winding of thermoplastic strips 5 about the tape-covered mandrel 1 is then synchronized with the operation of the pulling means, incrementally or continuously as preferred. Upon passage through the heater 7, or upon a halt therein, a section of the fibre reinforced thermoplastic strip winding is subjected to a temperature necessary for melting the polymer matrix. On exit from the heater the fibre reinforced thermoplastic strips consolidate into homogenous composite pipe sections which are successively pulled off from the second end of the mandrel 1, incrementally or continuously as preferred, by operation of the pulling means.

In a closing step of the method according to the present invention, the composite pipe is cleaned internally from the slip-sheath tape 10. Any residues of slip-sheath material may be removed by flooding the pipe interior with a liquid, preferably water which is effective for removing a paper based slip-sheath material such as paper. Alternatively or in addition thereto, a mechanical cleaning may be carried out by means of rotating brushes which are driven or fed through the pipe interior, e.g.

Through the method and assembly disclosed herein, unspecified or continuous lengths of homogenously structured composites pipes may be produced, lacking an internal liner. Due to the strength and inherent elasticity of the composite material, kilometer lengths may be produced this way for industrial fluid transport, such as flow-lines, pipelines, sub-sea risers for oil and/or gas, umbilical pipes, etc., as well as structural elements in off-shore and land-based applications.

The present invention provides an advantage above the prior composite pipes which include an internal liner, in that the entire pipe section is built up according to the invention as a homogenous material, and thus cracking due to different material properties can be avoided. In addition thereto, the suggested composite pipe and process is cost-saving, avoiding a separate process of fabricating an internal liner.

Modifications to the detailed design are possible within the scope of invention as defined through the appended claims. Thus, it will be appreciated by a man skilled in the art, that each feature disclosed in subordinated claims will contribute to the advantages of the invention also in other combinations than those expressively outlined in the subordinated claims.

I claim:

1. An assembly for producing a homogenous composite pipe of unspecified length, the assembly comprising:
    a mandrel stationary supported in a first end to extend freely in a process direction from said first end to a second end, wherein the mandrel has a stationary outer surface;
    a slip-sheath former configured to form a slip-sheath about the mandrel, said slip-sheath former is arranged to apply a tape material longitudinally onto the stationary outer surface of the mandrel;
    a winder mechanism revolving about the mandrel downstream of said first end carrying at least one supply of thermoplastic material strips;
    a heater surrounding the mandrel downstream of the winder mechanism and upstream of said second end for consolidating a section of wound thermoplastic material strip; and
    a puller arranged downstream of the mandrel to be connectable to the slip-sheath for pulling the slip-sheath and thereby the consolidated pipe sections off from the second end of the stationary mandrel.

2. The assembly according to claim 1, wherein operations of the winder mechanism and heater are synchronized with an incremental operation of the puller.

3. The assembly according to claim 1, wherein operations of the winder mechanism and heater are synchronized with a continuous operation of the puller.

4. The assembly according to claim 1, wherein the slip-sheath former comprises at least one rotary supply of tape-shaped slip-sheath material arranged upstream of the winding mechanism for feeding the tape longitudinally along the mandrel.

5. The assembly according to claim 4, wherein the slip-sheath former comprises a tape guide funnel that controls the tape to conform to the shape of the mandrel.

6. The assembly according to claim 1, wherein the puller comprises a large diameter spool driven for rotation, onto which the composite pipe is wound from the mandrel.

7. The assembly according to claim 1, wherein the second end of the mandrel is non-supported.

8. The assembly according to claim 1, as used for the production of a flow-line for transportation of fluids.

9. The assembly according to claim 1, as used for the production of a sub-sea structure for the off-shore industry.

10. The assembly according to claim 1, as used for the production of a production or injection riser for oil and/or gas and/or water.

11. The assembly according to claim 1, as used for the production of an umbilical pipe in the off-shore industry.

* * * * *